United States Patent

Shiokawa

[11] Patent Number: 5,988,590
[45] Date of Patent: Nov. 23, 1999

[54] BALL VALVE ELEMENT AND METHOD OF MANUFACTURING A BALL VALVE ELEMENT

[75] Inventor: Seiji Shiokawa, Mishima, Japan

[73] Assignee: Kohshin Engineering Co., Ltd., Mishima, Japan

[21] Appl. No.: 08/690,751

[22] Filed: Aug. 1, 1996

[30] Foreign Application Priority Data

Aug. 16, 1995 [JP] Japan ..................................... 7-229611

[51] Int. Cl.$^6$ ..................................................... F16K 5/06
[52] U.S. Cl. .................................. 251/315.14; 251/315.16
[58] Field of Search ............................ 251/315.16, 315.14

[56] References Cited

U.S. PATENT DOCUMENTS

| | | | |
|---|---|---|---|
| 3,246,873 | 4/1966 | Johnson | 251/315.16 X |
| 3,501,128 | 3/1970 | Pool | 251/315.16 X |
| 3,737,145 | 6/1973 | Heller et al. | 251/315.16 X |
| 4,568,059 | 2/1986 | Kawase et al. | 251/315.16 X |
| 4,678,161 | 7/1987 | Bando et al. | 251/315.16 X |

FOREIGN PATENT DOCUMENTS 2 364 388  11/1975  Germany ........................ 251/315.15

*Primary Examiner*—John Fox
*Attorney, Agent, or Firm*—Oblon, Spivak, McClelland, Maier & Neustadt, P.C

[57] ABSTRACT

A method of manufacturing a ball valve element includes a recess forming step in which a press die is used to form two stem recesses in an outer peripheral surface of pipe material cut to a prescribed size, the stem recesses being formed at positions that are symmetrical with respect to the center axis of the pipe material, and a ball-shaped element forming step in which the pipe material in which the stem recesses have been formed is placed in a split die having substantially spherical forming surfaces, with the openings in the pipe material facing the spherical forming surfaces of the split die, and pressure is exerted by the split die to uniformly and symmetrically deform the pipe material into a sphere.

5 Claims, 3 Drawing Sheets

BALL VALVE ELEMENT AND METHOD OF MANUFACTURING A BALL VALVE ELEMENT

BACKGROUND OF THE INVENTION

1. Field of the Invention

The present invention relates to an element for a ball valve provided in a fluid circuit for switching between a state in which a fluid can flow and a state in which a fluid is prevented from flowing, and to a method of manufacturing a ball valve element.

2. Description of the Prior Art

A ball valve element is a ball-shaped member that has a through-hole for passage of a hydraulic fluid. The element also has a recess formed on the outside surface of the element into which a stem fits for rotating the element. A ball valve element is usually produced by shearing off a piece of round bar, machining the sheared piece to the required ball shape, and drilling a hole through the valve element. Alternatively, the valve element can be cast or forged, then machined to shape and drilled.

In recent years, methods have been proposed for reducing the time it takes to manufacture ball valve elements, and for making the elements at a lower cost. In one such method disclosed by JP-B-6-21670, a press die is used to form pipe into a ball shape. This conventional method comprises a step in which a recess is formed for the valve stem, which is followed by a step in which the outer surface is formed into a spherical shape. However, in the latter step, the pipe has to be formed into the spherical shape with a spacer inserted into the recess. For this, the workpiece (the pipe) to be shaped has to be aligned precisely in the direction from which the spacer is inserted into the recess. This positioning of the workpiece is a time-consuming task that makes it difficult to raise operational efficiency. Another drawback is that the need to provide spacer material increases the structural complexity of the press die, and an error in positioning the workpiece can result in a defectively formed product or a damaged die.

Moreover, if in an effort to facilitate the positioning of the workpiece the spherical surface is formed without using a spacer, the result is a major difference in deformation resistance between the side where the recess has been formed and the opposite side where no recess has been formed. This can give rise to eccentrically formed recesses, the need to include a large machining tolerance since a precise spherical surface cannot be achieved, and other such problems.

An object of the present invention is to provide a ball valve element and a method of manufacturing a ball valve element that prevents the formation of eccentric recesses and eliminates the need to position the ball valve element workpiece material.

SUMMARY OF THE INVENTION

To attain the above object, the present invention provides a method of manufacturing a ball valve element, comprising a recess forming process step in which a press die is used to form two stem recesses in an outer peripheral surface of pipe material cut to a prescribed size, the stem recesses being formed at positions that are symmetrical relative to a central axis of the pipe material, and a ball-shaped element forming process step in which the pipe material in which the stem recesses have been formed is placed in a split die having substantially spherical forming surfaces with openings in the pipe material facing the spherical forming surfaces of the split die, and pressure is exerted by the split die to uniformly and symmetrically deform the pipe material into a sphere.

The above method also includes inserting a sleeve into the pipe material in which the stem recesses have been formed, before the pipe material is placed in the split die to be formed into a sphere.

The ball valve element according to the present invention is formed by cutting pipe material to a prescribed size, forming two stem recesses in the outer peripheral surface of the pipe material, with the stem recesses being formed at positions that are symmetrical relative to the central axis of the pipe, which is then formed into the shape of a ball.

As described above, the pipe material is formed into a ball shape after the two stem recesses have been formed in the peripheral surface at symmetrical positions, enabling the recesses to be formed without eccentricity. Moreover, the pipe material can be set in the die without concerns about directionality. This sharply reduces problems such as damaged dies and defective products caused by faulty workpiece positioning, and at the same time enhances operational efficiency.

Further features of the invention, its nature and various advantages will be more apparent from the accompanying drawings and following detailed description of the invention.

DESCRIPTION OF THE PREFERRED EMBODIMENT

An embodiment of the present invention will now be described with reference to the drawings.

Figure 1:
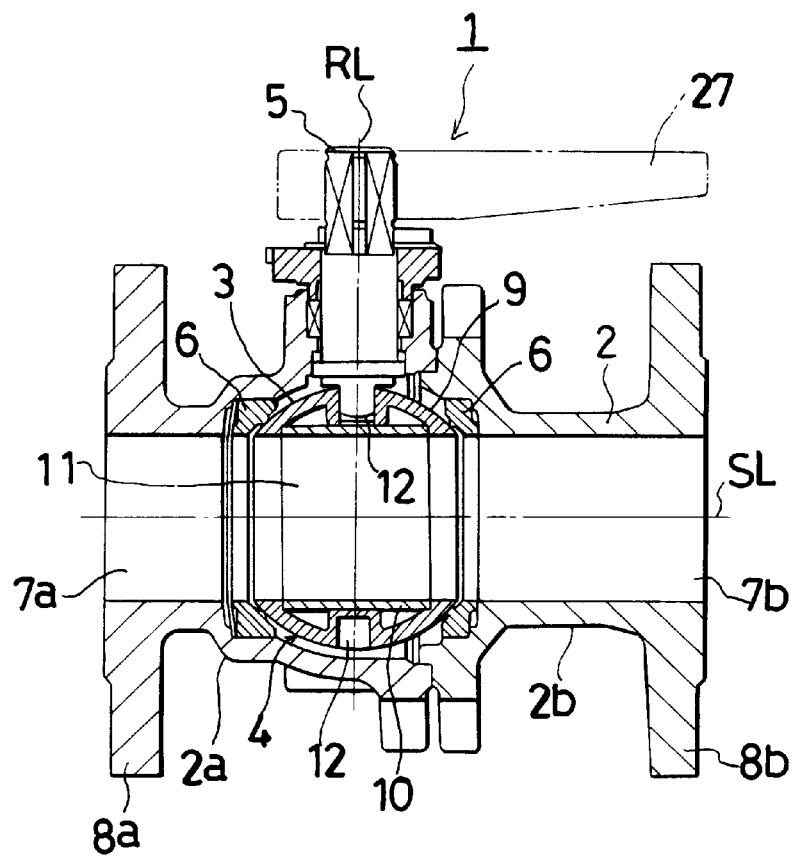
FIG. 1 is a cross-sectional view showing the valve element of this invention incorporated in a ball valve.

With reference to FIG. 1, a ball valve 1 is comprised principally of a cast iron casing 2 constituted by a pair of separable members 2a and 2b, a ball-shaped valve element 4 rotatably provided in a valve chamber 3 formed by the casing, and a stem 5 for rotating the valve element 4. Packing 6 is provided between the valve chamber 3 and the valve element 4, around the stem 5, and at other appropriate places to prevent leakage of fluid.

The casing 2 has flow channels 7a and 7b that pass through the valve chamber 3. The ends of the channels 7a and 7b away from the valve chamber 3 are provided with flanges 8a and 8b for connecting to piping.

Figure 2:
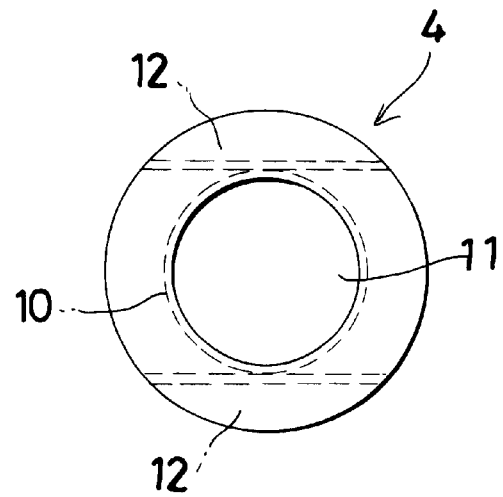
FIG. 2 is a side view of an embodiment of the ball valve of the invention.

As shown in FIG. 2, the valve element 4 is a ball-shaped member comprised by a spherical shell 9 having a sleeve 10 inserted therein, and a through-channel 11 that can communicate with the flow channels in the casing, the through-channel 11 being formed perpendicularly to the center of rotation RL of the valve element 4. A stem recess 12 is formed at two places on the outside peripheral surface of the spherical shell 9 through which the center of rotation RL passes. The recesses 12 each serve to transmit the turning force of the stem 5 to the valve element 4. Provided the recesses 12 are shaped so that the stem 5 does not rotate therein and is strong enough not to break, the recesses 12 may each be in the form of a groove having a square cross-section and a bottom, as in this embodiment or in the form of a groove having no bottom. The recesses 12 are located at two points along the center of rotation RL and are symmetrical with respect to the central axis SL of the through-channel 11 (at the top and bottom, with respect to the illustrated embodiment). Thus, the valve element 4 is formed symmetrically both vertically and horizontally.

The end of the stem 5 fits into one of the two recesses 12 in the valve element 4. The other recess 12 is only used as a backup. If a recess 12 is damaged by the turning force of the stem 5, the valve element 4 can be rotated vertically to use the other recess 12. While the above description has been made with reference to the formation of two recesses 12, a single recess 12 may be formed instead of two recesses.

Figure 3:
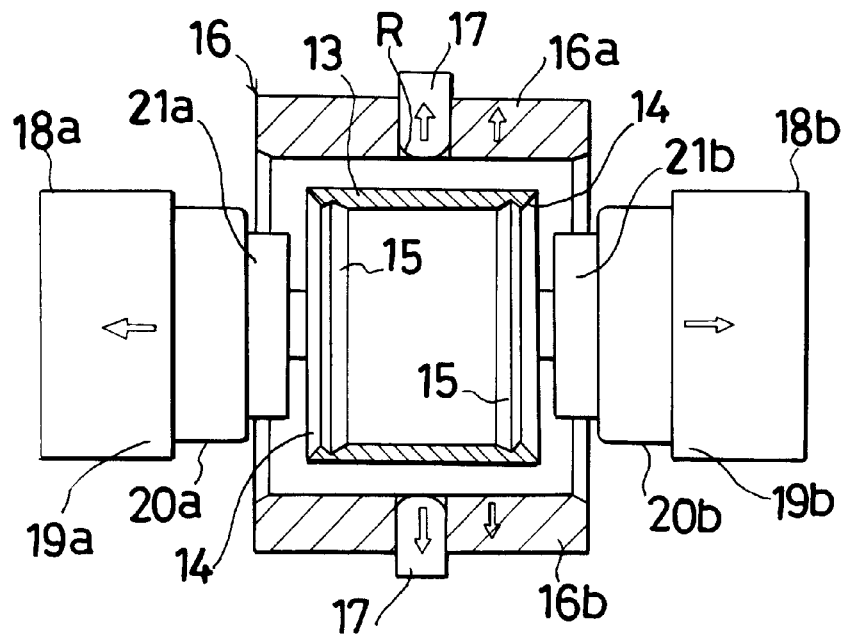
FIG. 3 is a cross-sectional view showing the recess forming press die with the pipe material inside.
Figure 4:
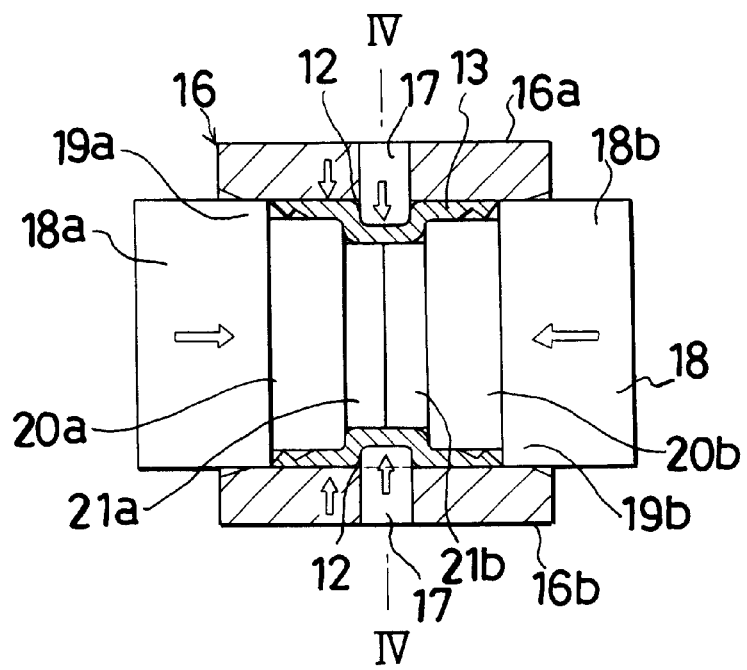
FIG. 4 is cross-sectional view showing the press die of FIG. 3 forming the stem recesses.
Figure 5:
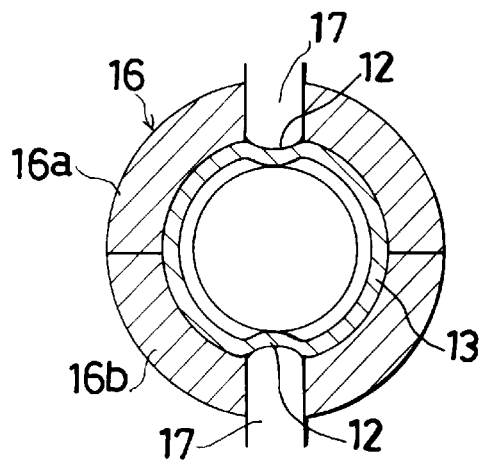
FIG. 5 is a cross-sectional view through line IV—IV of FIG. 4.

The method of manufacturing the valve element 4 of the ball valve 1 thus constituted will now be described with reference to FIG. 3. First, pipe material is cut to a prescribed size. A tapered portion 14 is formed on the inside edge of each of the pipe material 13 openings; on the inner side of the tapered portion 14, a groove 15 is formed that engages with the sleeve 10. The tapered portion 14 and groove 15 are formed by machining. Next, the stem recesses 12 are formed in the pipe material 13. As shown in FIG. 3, the recesses 12 are formed using a press die 16 that splits vertically into an upper die half 16a and a lower die half 16b. With the press die 16 closed on the pipe material 13, there is a plate-shaped punch 17 that can be pressed inward through an opening in the center of each of the die halves 16a and 16b.

The press die 16 is also provided with a pair of core dies 18a and 18b disposed at the openings thereof. The core dies 18a and 18b can be retractably inserted into the openings, and have large-diameter base portions 19a and 19b, small-diameter front ends 21a and 21b, and mid-diameter portions 20a and 20b for insertion into the pipe material 13. The steps between the large-diameter portions 19a and 19b and the mid-diameter portions 20a and 20b have the function of positioning the pipe material 13 by pressing against the ends of the pipe material 13. The function of the mid-diameter portions 20a and 20b is to maintain the inside diameter of the pipe material 13. The small-diameter portions 21a and 21b function like a female die in which the recesses 12 are formed by the insertion of the punches 17.

To form the recesses 12 with the press die 16, the upper and lower die halves 16a and 16b are opened and the pipe material 13 placed inside and held in position by an appropriate jig (not shown), as shown in FIG. 3. When the press die 16 is closed and the core dies 18a and 18b are inserted into the pipe material 13, the pipe material 13 is positioned by the positioning portions of the core dies 18a and 18b. When this positioning has been completed, the upper and lower punches 17 are pushed inwards under a powerful pressure to recess a portion of the pipe material 13 around the small-diameter portions 21a and 21b of the core dies 18a and 18b. During the time the punches 17 are being forced in to create the recesses, the upper and lower die halves 16a and 16b are clamped onto the outer surface of the pipe material 13 while the mid-diameter portions 20a and 20b of the core dies 18a and 18b are held against the inside surface of the pipe material 13. This enables the recesses 12 to be formed at positions on the pipe material 13 that are symmetrical with respect to the central axis SL (at the top and bottom, in the drawing). It is preferable that the dimensions of the recesses 12 (the thickness of the punches 17) formed in this step be set to be slightly larger than the finish dimensions.

Figure 6:
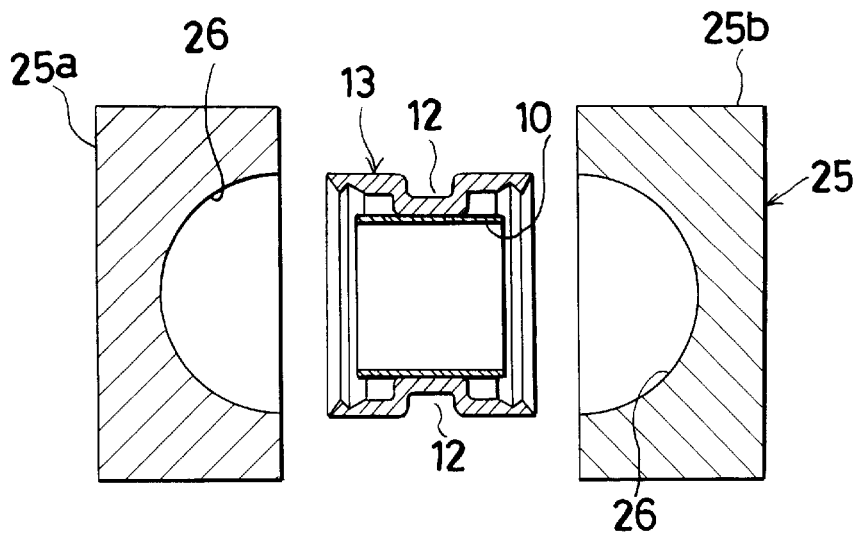
FIG. 6 is a cross-sectional view showing the ball forming press die with the pipe material inside.

After completion of the recess forming step, the sleeve 10 is inserted into the pipe material 13 for the step in which the pipe material 13 is formed into a ball (FIG. 6). A press die 25 used in the ball-forming process step has substantially spherical internal forming surfaces 26 and can be split into two. In the illustrated configuration, the press die 25 is split into a left half 25a and a right half 25b. The pipe material 13 in which the recesses 12 have been formed is placed in the press die 25, preferably with the openings of the pipe material 13 facing the forming surfaces 26. It is not necessary to insert a spacer or the like into the recesses 12 during this forming step, and since the pipe material 13 is to be formed into a sphere, it is not necessary to strictly or precisely specify the directional alignment of the pipe material 13 relative to the die 25. Forming precision is not affected even if the direction is changed each time. Compared to the conventional arrangement, this makes it easier to charge the die, improves efficiency, and makes it possible to automate the die charging process.

Figure 7:
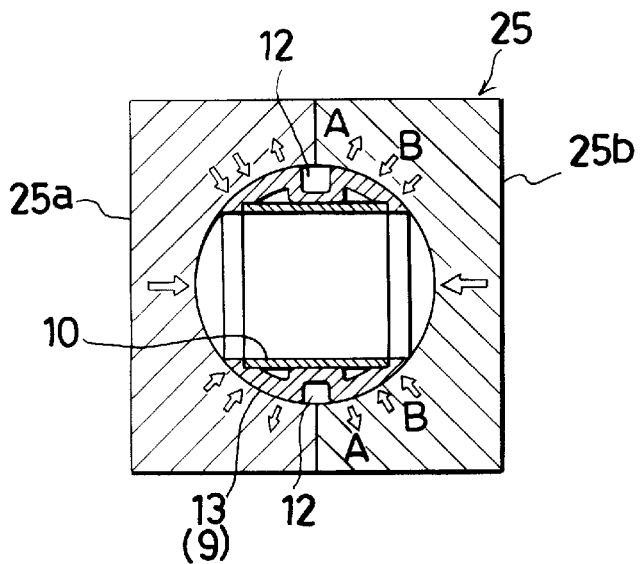
FIG. 7 is a cross-sectional view showing the press die of FIG. 5 in the process of forming a ball.

With reference to FIG. 7, when the loaded die halves 25a and 25b are brought together under pressure, the forming surfaces 26 of the die halves 25a and 25b compress the opening portions of the pipe material 13 in the direction indicated in FIG. 7 by the arrows B, while at the same time buckling causes the diameter of the center portion of the pipe material 13 to expand in the direction indicated by the arrows A. Since the recesses 12 are formed symmetrically on the pipe material 13, the pressure at each end is balanced (in the drawing, the pressure acting on the upper part and the pressure acting on the lower part), so overall, the pressure acts uniformly. As a result, there is no deformation of the recesses 12, so machining allowance can be minimized.

The compression of the opening portions of the pipe material 13 folds the groove 15 around the ends of the sleeve 10, thereby fixing the sleeve 10 in place, and the tapered portion 14 becomes more or less flush with the inside surface of the sleeve 10. When the pipe material 13 is subjected to sufficient pressure, the center portion buckles outward and plastically deforms to the shape of the forming surfaces of the die, thereby forming the pipe material 13 into a ball in the form of the spherical shell 9. In the pressing process, the internal dimension of each recess 12 is reduced together with each portion mating with the shoulder portion R (FIG. 3), minimizing the amount to be machined to achieve prescribed finish dimensions.

When a valve element 4 manufactured by this method is incorporated into the casing, the end of the stem 5 can be inserted in either of the two recesses 12 formed in the valve element 4. By thus facilitating the orientation of the valve element 4 involved in the ball valve 1 assembly operation, the time required for assembly can be shortened.

As shown in FIG. 1, the ball valve 1 thus assembled allows fluid to flow therethrough when the through-channel 11 of the valve element 4 is in communication with the casing flow channels 7a and 7b. In the configuration of this embodiment, the sleeve 10 incorporated in the valve element 4 so as to be slidable on the inside surface of the through-channel 11 is used to set the sectional area to a constant value, creating a laminar flow in the through-channel 11 having little turbulence. A handle 27 fixed to the upper end of the stem 5 projecting from the casing is used to turn off the flow. When this handle 27 is turned, the stem 5 rotates the valve element 4 about its center of rotation RL, causing the flow channels to be closed by the peripheral surface of the valve element 4, thus stopping the flow.

Closing the valve suddenly abruptly stops the fluid flow in the channels 7a and 7b and in other channels connected to the ball valve 1. The inertia of the fluid can produce an abnormal build-up of pressure in the valve element 4 (the water hammer effect). The side walls of the recesses 12 act as reinforcing ribs against this abnormal pressure. Thus, even if the valve element 4 material is thinner compared with one that is forged or cast, this ensures that the valve element 4 has adequate strength.

In the above-described embodiment, a sleeve 10 is slidably provided in the through-channel 11 to ensure a laminar flow through the valve element 4 and maintain a constant sectional area. However, the valve element 4 is fully functional even without a sleeve 10. If a sleeve 10 is not incorporated, there is no need to form a groove 15 on the inside surface of the pipe material 13.

While the press dies 16 and 25 have been described as being divided and moved in a certain direction, it is to be understood that this is not limitative. For example, the die used to form the pipe material 13 into a sphere may be one that is divided vertically.

As has been described in the foregoing, in accordance with this invention, the pipe material has two recesses that are formed symmetrically, so when pressure is applied in the ball forming step, the pressure (the resistance to plastic deformation) at each end is balanced. This means that the pipe material can be deformed to shape without being subjected to excessive force, thereby preventing the recesses from becoming eccentrically deformed. This means that there is no need to use spacers such as are conventionally used to prevent eccentric deformation of the recesses, so the configuration of the press dies can be simplified. Moreover, there is also no need for alignment when positioning the pipe material in the die. This can facilitate automation of the die charging process, enhance operational efficiency, and sharply reduce problems such as damaged dies and defective products caused by faulty positioning of the material.

In addition, the ease with which a balanced pressure can be obtained at each end in the ball forming step makes it easier to achieve higher forming precision that ensures higher sphericity of the ball valve elements. In turn, this means that less material has to be machined for finishing. Reducing the amount of material that is machined raises the yield, is more resource and energy efficient, and helps to reduce manufacturing costs.

The side walls of the recesses formed in the outside surface also strengthens the valve element and makes the outside surface of the element able to withstand abnormal pressures produced by the inertia of fluid in the system, when the ball valve is closed. This means that thinner pipe material can be used, which in addition to reducing manufacturing costs makes the valve lighter and easier to handle.

The sleeve inside the pipe material is fixed in place in the ball forming step by the contraction of the opening portions of the pipe material, which also simplifies the manufacturing process by eliminating the need to use welding or special support means to hold the sleeve in place.

What is claimed is:

1. A ball valve element for a valve device, which is operated by an operating stem for rotating the ball valve about a diametrical axis for selective opening or closing of a passageway for a fluid formed in a casing, said ball valve comprising:

a spherical thin walled shell formed from pipe material;
   said spherical thin walled shell forming a central passageway having a longitudinal axis extending substantially transversely to said diametric axis of the ball valve element;
   said spherical thin walled shell further forming a pair of recesses as one-piece parts of the spherical thin walled shell which are arranged symmetrically with respect to the longitudinal axis of the central opening and which are located along said diametric axis of the ball valve, one of the recesses being provided for receiving said operating stem, the other being a back-up for said one recess;
   each of said recesses as a one-piece part of the spherical thin walled shell having a pair of side walls extending substantially transversely to said longitudinal axis of said central passageway;
   each of said recesses having a bottom wall, which extends alone a substantially entire chord length in an outer peripheral circular shape of the spherical shell in a diametric plane transverse to the longitudinal axis of the simple passageway.

2. A ball valve element according to claim 1, wherein said spherical thin walled shell is symmetrical about said longitudinal axis and symmetrical about said diametrical axis.

3. A ball valve element for a valve device, which is operated by an operating stem for rotating the ball valve about a diametrical axis for selective opening or closing of a passageway for a fluid formed in a casing, said ball valve comprising:

a spherical thin walled shell formed from pipe material;
   said spherical thin walled shell forming a central passageway having a longitudinal axis extending substantially transversely to said diametric axis of the ball valve element;
   a cylindrical sleeve mounted within said spherical thin walled shell and having the same longitudinal axis as said spherical thin walled shell;
   said spherical thin walled shell further forming a pair of recesses as one-piece parts of the spherical thin walled shell which are arranged symmetrically with respect to the longitudinal axis of the central opening and which are located along said diametric axis of the ball valve, one of the recesses being provided for receiving said operating stem, the other being a back-up for said one recess;
   each of said recesses as a one-piece part of the spherical thin walled shell having a pair of side walls extending substantially transversely to said longitudinal axis of said central passageway, said side walls extending from a surface of the spherical thin walled shell to said cylindrical sleeve, said side walls acting to increase the strength of the spherical shell;
   each of said recesses having a bottom wall, which extends along a substantially entire chord length in an outer peripheral circular shape of the spherical shell in a diametric plane transverse to the longitudinal axis of the simple passageway; and
   said spherical thin walled shell having grooves on its inner surface to receive ends of said cylindrical sleeve.

4. A ball valve element according to claim 3, wherein said spherical thin walled shell is spaced from said cylindrical sleeve by said side walls.

5. A valve device comprising:

a casing having a passageway for a fluid;

a ball valve element arranged in the casing, and;

an operating stem engaged with the ball valve element so that the ball valve element is rotated in the casing about a diametrical axis of the ball valve element so that said passageway is selectively opened or closed;

said ball valve comprising a spherical thin walled shell formed from pipe material;

said spherical thin walled shell forming a central passageway having a longitudinal axis extending substantially transversely to said diametrical axis of the ball valve element;

said spherical thin walled shell further forming a pair of recess as one-piece parts of the spherical thin walled shell which are arranged symmetrically with respect to the longitudinal axis of the central opening and which are located along said diametrical axis of the ball valve, one of the recesses being provided for receiving said operating stem, the other being a back-up for said one recess;

each of said recesses as a one-piece part of the spherical thin walled shell having a pair of side walls extending substantially transversely to said longitudinal axis of said central passageway;

each of said recesses having a bottom wall, which extends along a substantially entire chord length in an outer peripheral circular shape of the spherical shell in a diametric plane transverse to the longitudinal axis of the simple passageway.

* * * * *

UNITED STATES PATENT AND TRADEMARK OFFICE
CERTIFICATE OF CORRECTION

PATENT NO. : 5,988,590

DATED : November 23, 1999

INVENTOR(S): Seiji SHIOKAWA

It is certified that an error appears in the above-identified patent and that said Letters Patent is hereby corrected as shown below:

On the Title page, item [45] is incorrectly listed. It should read:

--- [45] Date of Patent: \* November 23, 1999 ---

-Also-

On the Title page, the CPA information has been omitted. It should read as follows:

--- [\*] Notice: This patent issued on a continued prosecution application filed under 37 CFR 1.53(d), and is subject to the twenty year patent term provisions of 35 U.S.C. 154(a)(2). ---

Signed and Sealed this

Seventeenth Day of April, 2001

*Attest:*

NICHOLAS P. GODICI

*Attesting Officer*     Acting Director of the United States Patent and Trademark Office